United States Patent
Kanjiya et al.

(10) Patent No.: US 9,425,726 B2
(45) Date of Patent: Aug. 23, 2016

(54) FAULT-TOLERANT WIND ENERGY CONVERSION SYSTEM

(71) Applicant: Masdar Institute of Science and Technology, Abu Dhabi (AE)

(72) Inventors: Parag Kanjiya, Abu Dhabi (AE); Bharath Ambati, Abu Dhabi (AE); Vinod Khadkikar, Abu Dhabi (AE)

(73) Assignee: Masdar Institute of Science and Technology, Abu Dhabi (AE)

(*) Notice: Subject to any disclaimer, the term of this patent is extended or adjusted under 35 U.S.C. 154(b) by 99 days.

(21) Appl. No.: 14/314,484

(22) Filed: Jun. 25, 2014

(65) Prior Publication Data

US 2015/0077067 A1 Mar. 19, 2015

Related U.S. Application Data (60) Provisional application No. 61/839,056, filed on Jun. 25, 2013.

(51) Int. Cl.
*H02P 9/10* (2006.01)
*H02H 7/06* (2006.01)

(52) U.S. Cl.
CPC . *H02P 9/10* (2013.01); *H02H 7/067* (2013.01)

(58) Field of Classification Search
CPC .................................. H02H 7/067; H02P 9/10
See application file for complete search history.

(56) References Cited

U.S. PATENT DOCUMENTS

| | | | | |
|---|---|---|---|---|
| 2001/0026427 A1* | 10/2001 | Mahlein | ............. | H02M 5/271 361/91.1 |
| 2007/0035136 A1* | 2/2007 | Janssen | ............. | F03D 9/003 290/44 |
| 2007/0052244 A1* | 3/2007 | Hudson | ............. | F03D 7/0272 290/44 |
| 2007/0189044 A1* | 8/2007 | Liu | ............. | H02M 5/297 363/34 |
| 2007/0278797 A1* | 12/2007 | Flannery | ............. | F03D 9/003 290/44 |
| 2008/0303489 A1* | 12/2008 | Park | ............. | H02M 5/4585 322/20 |
| 2009/0206606 A1* | 8/2009 | Jorgensen | ............. | F03D 7/0224 290/44 |
| 2009/0250931 A1* | 10/2009 | Schubert | ............. | H02P 9/007 290/44 |

(Continued)

OTHER PUBLICATIONS

Kanjiya, Parag et al, "A Novel Fault-Tolerant DFIG-Based Wind Energy Conversion System for Seamless Operation During Grid Faults", IEEE Transactions on Power Systems, vol. 29, No. 3, May 2014, pp. 1296-1305.

*Primary Examiner* — Tulsidas C Patel
*Assistant Examiner* — Viet Nguyen
(74) *Attorney, Agent, or Firm* — Grossman Tucker Perreault & Pfleger, PLLC (57) ABSTRACT

This disclosure is directed to a fault-tolerant energy conversion system. A fault-tolerant doubly-fed induction generator (DFIG) for use with a wind energy conversion system (WECS) consistent with the present disclosure may allow for seamless operation during all kinds of grid faults. In one embodiment, a six-switch grid side converter (GSC) commonly used with such systems may be replaced with nine-switch converter circuitry. With three additional switches, the nine-switch converter can provide two independent three phase outputs. For example, one three-phase output may be coupled to the grid through interfacing inductors to realize normal GSC operation, while the other three-phase output may be coupled to neutral side of the stator windings to provide fault ride-through (FRT) capability to the DFIG. A control algorithm may be employed that both achieves seamless fault ride-through during any kind of grid faults and strictly satisfies grid codes requirements.

13 Claims, 10 Drawing Sheets

(56) References Cited

U.S. PATENT DOCUMENTS

| | | | |
|---|---|---|---|
| 2009/0265040 A1* | 10/2009 | Paluszek | H02M 5/297 700/287 |
| 2011/0156389 A1* | 6/2011 | Arlaban Gabeiras | F03D 9/005 290/44 |
| 2012/0150524 A1* | 6/2012 | Nielsen | H02J 3/386 703/18 |
| 2012/0206076 A1* | 8/2012 | Tanaka | H02P 27/08 318/400.28 |
| 2012/0217824 A1* | 8/2012 | Gupta | F03D 9/02 307/145 |
| 2013/0009610 A1* | 1/2013 | Niiranen | H02P 9/007 322/19 |
| 2013/0049707 A1* | 2/2013 | Wang | H02P 6/00 322/21 |
| 2013/0249501 A1* | 9/2013 | Lu | F03D 7/0224 322/21 |
| 2015/0137520 A1* | 5/2015 | Garcia | H02J 3/1885 290/44 |

* cited by examiner

Table I - System Specifications

Wind turbine specifications

| | |
|---|---|
| Nominal output power | 1.5MW |
| Rated wind speed | 11m/s |
| Operating range | 6m/s to 30m/s |

Generator specifications

| | |
|---|---|
| Rated apparent power | 1.667MVA |
| Rated voltage | 575V |
| Rated frequency | 60Hz |
| Number of poles | 6 |
| Stator to rotor turns ratio | 575/1975 |
| Stator resistance | 0.0023pu |
| Stator inductance | 0.18pu |
| Rotor resistance referred to stator | 0.0016pu |
| Rotor inductance referred to stator | 0.16pu |
| Magnetizing (mutual) inductance | 2.9pu |
| Inertia constant | 0.685s |
| Stator winding: Accessible on neutral side. | |

Others

| | |
|---|---|
| Coupling inductance for GSC | 0.3pu |
| Resistance of coupling inductor | 0.003pu |
| Nominal dc link voltage | 1150V |
| DC bus capacitor | 10mF |
| Reactive support by static capacitor bank at DFIG terminal | 120kVAr |
| Dynamic breaking resistor (DBR) | 0.8? |

FAULT-TOLERANT WIND ENERGY CONVERSION SYSTEM

PRIORITY

The present non-provisional U.S. patent application claims benefit under 35 U.S.C. §120 of U.S. Provisional Patent Application No. 61/839,056 entitled, "FAULT-TOLERANT WIND ENERGY CONVERSION SYSTEM" that was originally filed on Jun. 25, 2013. The contents of the above-identified provisional application are incorporated herein, in entirety, by reference.

TECHNICAL FIELD

The present disclosure relates to energy generation, and more particularly, to a fault tolerant system for a wind-based generation system using a doubly-fed induction generator.

BACKGROUND

Figure 1:
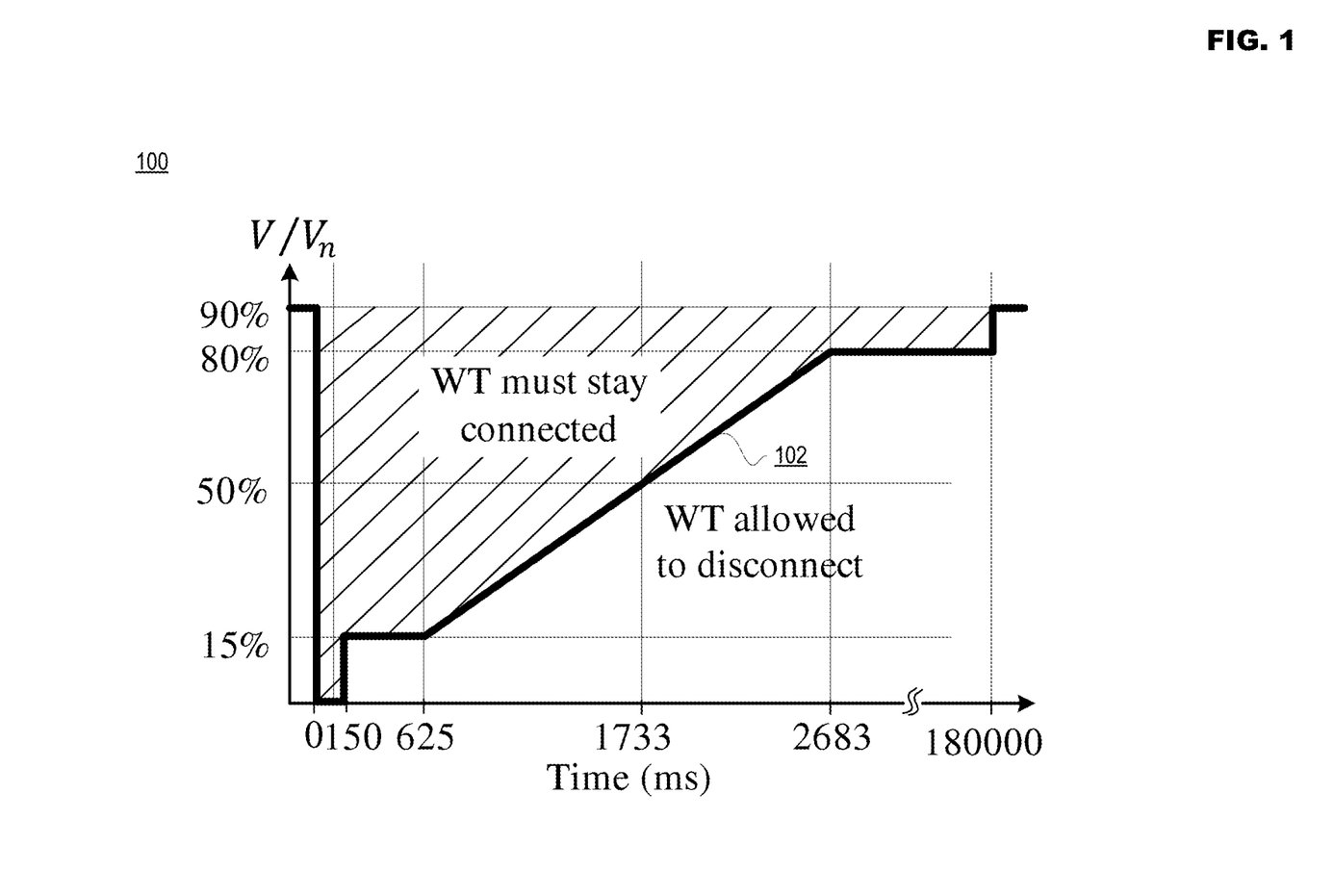
FIG. 1 illustrates an example FRT requirement curve in accordance with at least one embodiment of the present disclosure.
Figure 2:
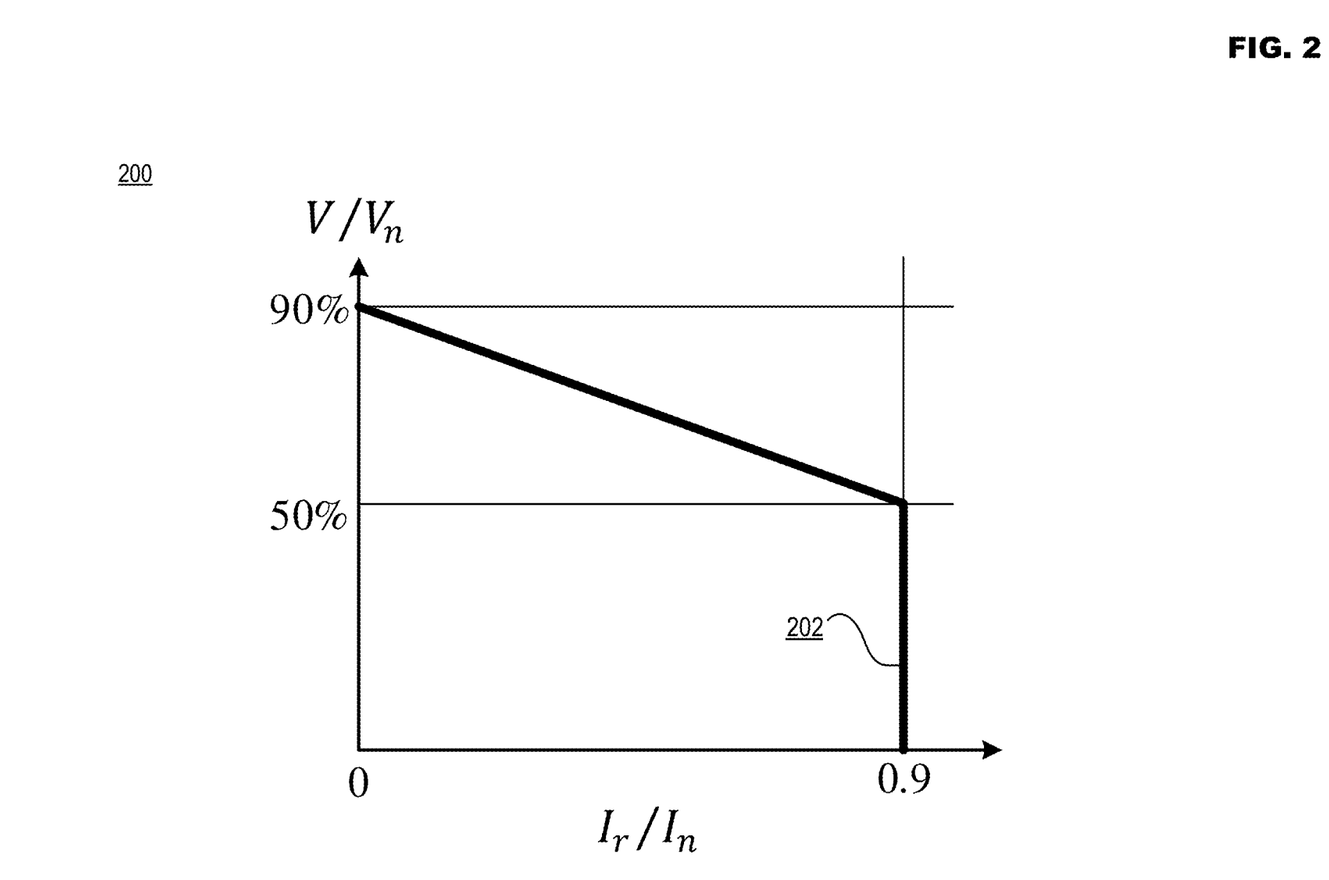
FIG. 2 illustrates an example FRT reactive support requirement curve in accordance with at least one embodiment of the present disclosure.

The incorporation of wind-powered generation into overall power generation strategies is continuing to increase. To improve the reliability of power systems with large-scale wind power integration, different countries have specified fault ride through (FRT) requirements for wind turbines (WT) in their respective grid codes. An example FRT requirement curve for WT (e.g., per German and Irish grid codes) is illustrated in FIG. 1. According to chart 100, a WT must stay connected when the terminal voltage remains above line 102. In addition to remaining connected to the transmission system, FIG. 2 illustrates that grid codes may put a stringent requirement on the reactive current supplied by a WT to improve the voltage security of the system. The example grid code requirements may be summarized as follows: a WT is required to stay connected during voltage dips above the specified level for the time duration set forth in chart 100, the WTs must support the grid voltage with additional reactive current during voltage dips as set forth in chart 200 (e.g., wherein, the voltage control must take place within 20 ms after the fault recognition), and the active power output of the WT must be continued immediately after the fault clearance and increased to the original value with a gradient of at least 20% of the rated power per second. These requirements are illustrated in chart 200 wherein the reactive current supplied by the WT must behave in accordance with line 202.

DFIGs are often used for grid-connected variable-speed WTs because of their ability to generate power with high-efficiency while still allowing for independent control of active and reactive power using partial capacity converters. In conventional DFIG architecture, the stator windings are directly connected to the grid and the rotor windings are connected to the grid via back-to-back connected voltage source converters (VSCs). These two VSCs can be identified as a rotor side converter (RSC) connected between the rotor and DC link, and a grid side converter GSC connected between the grid and DC link via interfacing inductors. As the stator windings are directly connected to the grid, a grid fault may cause a voltage dip at the DFIG terminals that directly affects the air-gap flux, and thus, the energy conversion process. Depending on the type of fault, the voltage dip may introduce a DC component, or a combination of a DC component and reverse rotating AC component, in the air-gap flux. These flux components induce high voltage in the rotor windings at rotational and/or double the rotational frequency. The RSC itself cannot limit these high frequency voltages due to modulation index constraint, and thus, loses its current control capabilities. Unless the proper mitigating measures are employed, the rotor currents under the grid fault condition can exceed the transient current ratings of the RSC. Grid faults may also cause severe mechanical stress on the bearings and the gear box of WECS due to torque pulsation.

Many solutions have been proposed to provide or improve the FRT capability of DFIG wind turbines. For example, during a grid fault a rotor crowbar may be used to disable the RSC and short circuit the rotor windings through resistors to limit the transient currents. A substantial drawback of this scheme is that a DFIG consumes huger reactive power during a grid fault, and shorting the DFIG in this manner may further aggravate voltage dips. Series dynamic resistors may also be employed to maintain the stator voltage or rotor currents within the limits, but may not be appropriate if the DFIG is being controlled to supply reactive power to the grid. Further, the above mentioned fault ride through techniques fail to maintain the pre-fault voltage across the stator windings, which causes undesired electrical and mechanical transients in the system.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Although the following Detailed Description will proceed with reference being made to illustrative embodiments, many alternatives, modifications and variations thereof will be apparent to those skilled in the art.

DETAILED DESCRIPTION

This disclosure is directed to a fault-tolerant wind energy conversion system. A fault-tolerant doubly-fed induction generator (DFIG) for use with a wind energy conversion system (WECS) consistent with the present disclosure may allow for seamless operation during all kinds of grid faults. In one embodiment, six-switch grid-side converter (GSC) circuitry commonly used with such systems may be replaced with nine-switch converter circuitry. With three additional switches, the nine-switch converter circuitry can provide two independent three phase outputs. For example, one three-phase output may be coupled to the grid through interfacing inductors/transformers to realize normal GSC operation, while the other three-phase output may be coupled to neutral side of the stator windings to provide fault ride-through (FRT) capability to the DFIG. A control algorithm may be employed that both achieves seamless fault ride-through during any kind of grid faults and strictly satisfies grid codes requirements.

To obtain transients free fault-ride through performance, it is necessary to keep pre-fault voltage across the stator windings during the grid faults. To achieve this, a dynamic voltage restorer (DVR) arrangement using additional VSC with an output filter and series transformer with bypass switches may be used. To provide protection against dead short circuit at the DFIG terminals, the DVR should be rated for full DFIG rating. This technique also involves an operational delay of auxiliary semi-conductor switches (e.g., to bypass the series transformer during normal condition), which makes electrical transients unavoidable. As a result of many auxiliary components being involved, this solution is very costly. In another proposed solution, a parallel grid side rectifier and series inverter at Y-point of the stator windings may be employed during balanced faults. This scheme effectively reduces the number of passive and active components used to achieve fault tolerant operation of DFIG. However, the stator windings would need to carry slip power during super-synchronous speeds. Moreover, the performance of the scheme during unbalanced faults is not investigated.

In one embodiment, seamless FRT operation in line with recent grid codes using minimum additional components may be achieved utilizing nine-switch converter circuitry. A traditional six-switch GSC of the DFIG may be replaced with nine-switch converter circuitry to provide two independent three-phase outputs. One of the three-phase outputs may be coupled to the grid via an interfacing inductor to realize normal GSC operation, while the second three-phase output may be connected to a neutral side of the stator windings to provide series voltage compensation to the DFIG for riding through any kind of grid fault. An algorithm for controlling the NSC may be able to achieve seamless fault ride through operation of the DFIG. To provide reactive current support in line with recent and/or proposed grid code requirements during grid fault conditions, a coordinated reactive power controller may share reactive current between the GSC and RSC. Fault-tolerant DFIG configurations consistent with the present disclosure may use only three extra switches to achieve transient free operation during any kind of grid fault.

Figure 3:
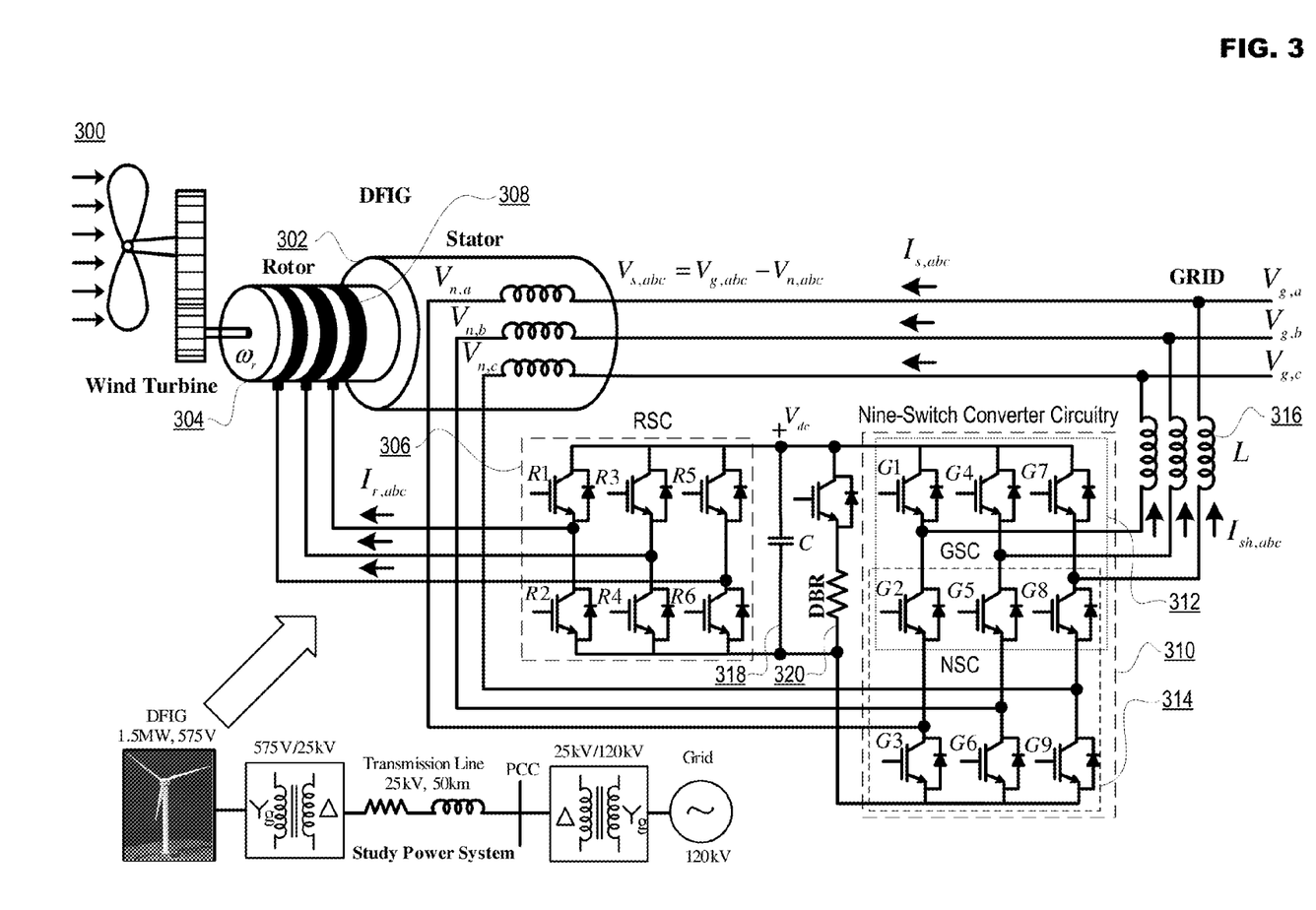
FIG. 3 illustrates an example configuration of a fault-tolerant generation system in accordance with at least one embodiment of the present disclosure.

FIG. 3 illustrates an example configuration of a fault-tolerant generation system in accordance with at least one embodiment of the present disclosure. Similar to a conventional DFIG, the windings of stator 302 may be coupled directly to the grid and the windings of rotor 304 may be connected to RSC circuitry 306 (e.g., switches R1 to R6) through slip rings 308. RSC 306 may share DC link capacitor (C) 318 with nine-switch converter circuitry 310 (e.g., switches G1 to G9) instead of conventional six-switch converter circuitry. The upper output of nine-switch converter circuitry 310 may be coupled to switches G1, G2, G4, G5, G7 and G8 corresponding to GSC circuitry 312. GSC circuitry 312 may be connected to the grid via interfacing inductor (L) 316. The lower output of nine switch converter circuitry 310 may be coupled to switches G2, G3, G5, G6, G8 and G9 corresponding to neutral-side converter (NSC) circuitry 314. NSC circuitry 314 may be connected to a neutral side of the stator windings of DFIG 300. As illustrated in FIG. 3, GSC circuitry 312 and NSC circuitry 314 may share use of central switches G2, G5 and G8.

During normal DFIG operation, the lower three switches of NSC circuitry 314 (e.g., G3, G6 and G9) may be short circuited to form a Y-point in the stator windings, while GSC circuitry 312 may be controlled to regulate the DC link voltage. During a voltage dip resulting from a grid fault, the lower three switches of the NSC circuitry 314 may start switching to generate compensating voltages for maintaining the pre-fault voltage across the neutral side of the stator winding. This switching may be referred to herein as NSC operation. NSC operation may absorb part of the active power generated by DFIG during a grid fault and may pump the active power into C 318, causing a rise in the DC link voltage if preventive measures are not taken. To protect the C 318 from over voltage during the grid faults, a dynamic braking resistor (DBR) 320 may be coupled across the DC link capacitor.

To analyze transient and steady state performance of a wound rotor induction machine with a six-terminal stator, it may be modeled in d–q reference frame rotating at synchronous speed. The voltage and flux equations of the induction machine with the six-terminal stator in d–q reference frame can be written as follows:

$$v_{sd} - v_{nd} = R_s i_{sd} + \frac{d\psi_{sd}}{dt} - \omega\psi_{sq} \quad (1)$$

$$v_{sq} - v_{nq} = R_s i_{sq} + \frac{d\psi_{sq}}{dt} + \omega\psi_{sd}$$

$$v_{rd} = R_r i_{rd} + \frac{d\psi_{rd}}{dt} - (\omega - \omega_r)\psi_{rq}$$

$$v_{rq} = R_r i_{rq} + \frac{d\psi_{rq}}{dt} + (\omega - \omega_r)\psi_{rd}$$

$$\psi_{sd} = L_{ls} i_{sd} + L_m(i_{sd} + i_{rd}) \quad (2)$$

$$\psi_{sq} = L_{ls} i_{sq} + L_m(i_{sq} + i_{rq})$$

$$\psi_{rd} = L_{lr} i_{rd} + L_m(i_{sd} + i_{rd})$$

$$\psi_{rq} = L_{lr} i_{rq} + L_m(i_{sq} + i_{rq})$$

wherein the suffixes d and q represent the d-axis and q-axis components of respective variables, $v_{sd}$ and $v_{sq}$ represent the voltages available at the grid side of the stator terminals, $v_{nd}$ and $v_{nq}$ represent the voltages available at the neutral side of the stator terminals and $v_{rd}$ and $v_{rq}$ represent the rotor terminal voltages. The variables $i_{sd}$ and $i_{sq}$ represent the stator currents while, $i_{rd}$ and $i_{rq}$ represent the rotor currents. $R_s$ and $R_r$ represent the stator and rotor resistances referred to the stator while, $L_{ls}$, $L_{lr}$ and $L_m$ represent the stator self-inductance, rotor self-inductance, and mutual inductances referred to the stator, respectively. $\omega$ is the supply angular frequency, while $\omega_r$ is the rotor angular frequency in electrical radians per second By aligning the d-axis of the reference frame to the air-gap flux, the simplified expressions for the electromagnetic torque developed and stator reactive power in terms of rotor variables can be written as, $$T_e = -\frac{\psi_{sd} L_m}{L_s} i_{rq} \quad (3)$$

$$Q_s = \frac{v_{sd}\psi_{sd}}{L_{ls}} - \frac{v_{sd}L_m}{L_{ls}}i_{rd} \quad (4)$$

From equations (3) and (4) it may be seen that, by aligning the d-axis of the reference frame to the air-gap flux, the electromagnetic torque developed is directly proportional to the q-axis rotor current, while the stator reactive power is directly proportional to the d-axis rotor current. Hence, by employing the decoupled control of $i_{rq}$ and $i_{rd}$, the electromagnetic torque, or active power, and the stator reactive power can be controlled independently by RSC circuitry 306.

Figure 4:
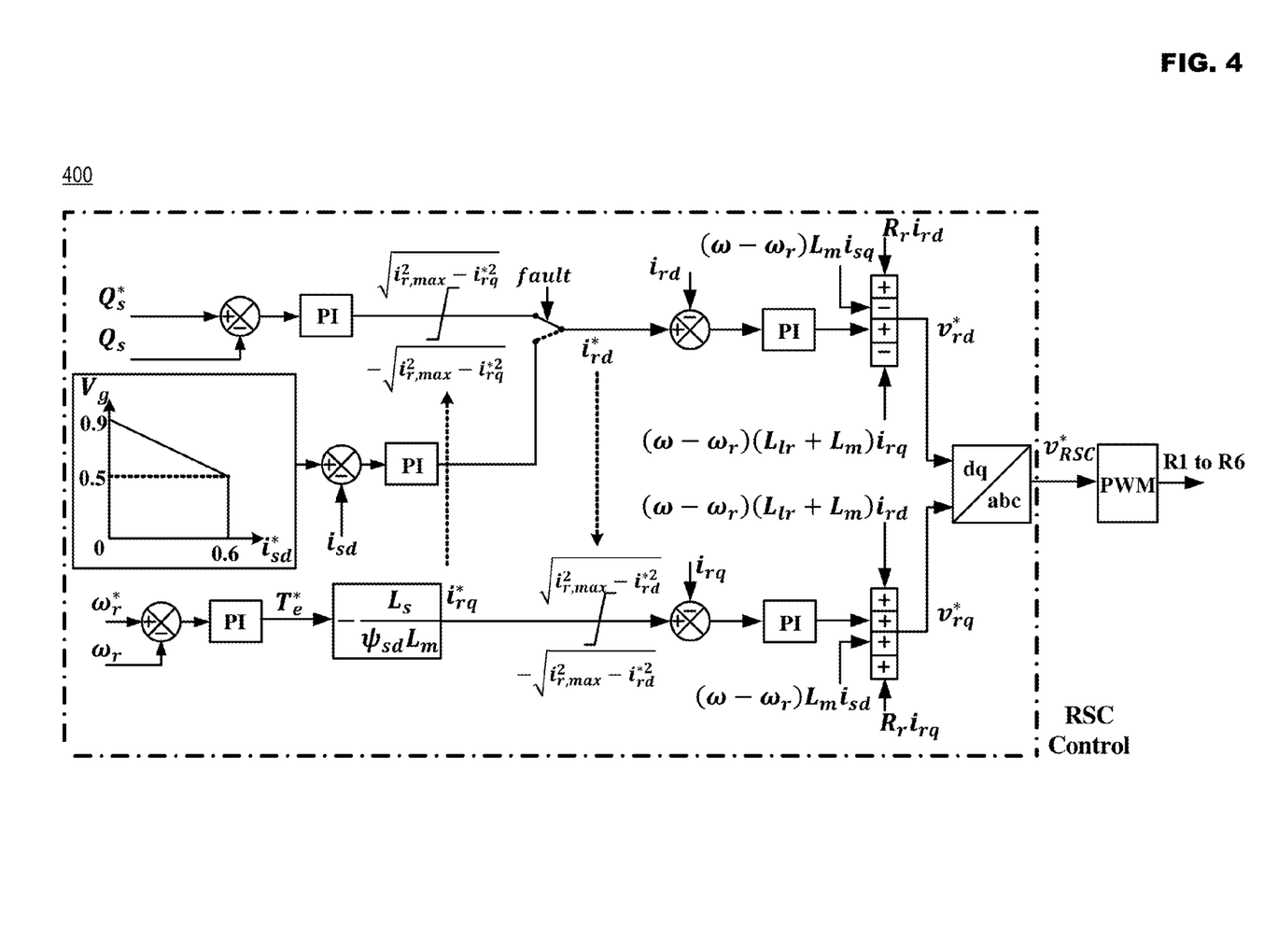
FIG. 4 illustrates an example rotor-side converter control in accordance with at least one embodiment of the present disclosure.

The control of RSC circuitry 306 and nine-switch converter circuitry 310 in a DFIG configuration consistent with the present disclosure may comprise two modes of operation: normal mode and fault mode. In normal mode operation, the DFIG may be controlled to supply maximum available active power by WT and user-define reactive power. To control the electromagnetic torque and the reactive power produced by a DFIG independently, in normal mode operation RSC circuitry 306 may be controlled in a synchronously rotating d–q reference frame with d-axis aligned to stator flux vector. The expressions for the electromagnetic torque and reactive power developed by the DFIG with d-axis oriented to stator flux are provided in equations (3) and (4), respectively. The electromagnetic torque, and hence active power, produced by the DFIG is proportional to $i_{rq}$ and may be regulated by controlling $v_{rq}$. On the other hand, reactive power produced by the DFIG is proportional to $i_{rd}$ and may be regulated by controlling $v_{rd}$. The detailed control diagram of RSC is shown in FIG. 4 at 400. The reference q-axis rotor current ($i^*_{rq}$) is calculated from reference torque command ($T^*_e$) generated using a proportional-integral (PI) controller over the rotor speed. The reference rotor speed command may be generated using a maximum power point (MPPT) algorithm. The reference d-axis rotor current ($i^*_{rd}$) may be generated using the PI controller over reactive power supplied by DFIG 300. During normal mode operation, $i^*_{rq}$ is allowed to take any value within the limits in order to extract the maximum power from WT while, $i^*_{rd}$ is limited, as per equation (5) to ensure RSC current is within the safe limit ($i_{r,max}$).

$$i^*_{rd,limit} = \pm\sqrt{i_{r,max}^2 - i^*_{rq}{}^2} \quad (5)$$

The reference rotor currents $i^*_{rd}$ and $i^*_{rq}$ may be tracked using a decoupled PI current control by regulating $v_{rd}$ and $v_{rq}$ as per equation (2). The gate signals (R1 to R6) for RSC are then issued by comparing the reference RSC voltage ($v^*_{RSC}$) with triangular carrier wave using sinusoidal PWM technique.

Figure 5:
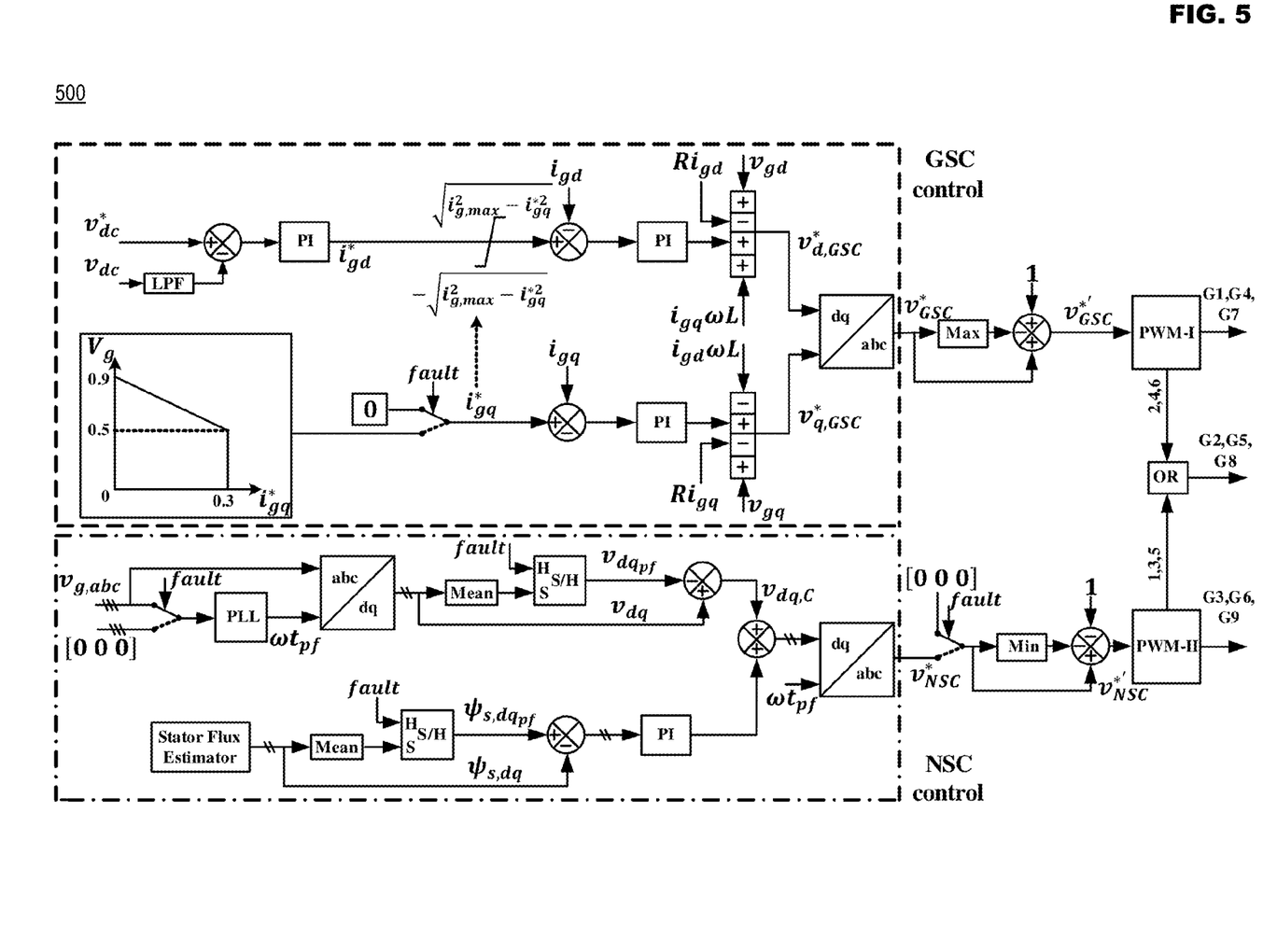
FIG. 5 illustrates an example nine-switch converter control in accordance with at least one embodiment of the present disclosure.

FIG. 5 illustrates an example nine-switch converter control in accordance with at least one embodiment of the present disclosure. The control of nine-switch converter circuitry 310 comprises two parts: the control of GSC circuitry 312 and the control of NSC circuitry 314. The objective of the GSC control is to regulate the DC link voltage to its reference value irrespective of direction of rotor power flow. The voltage balance equation across interfacing inductor (L) with internal resistance (R) in synchronous reference frame can be written as:

$$v^*_{d,GSC} = Ri_{gd} + L\frac{di_{gd}}{dt} - \omega Li_{gq} + v_{gd} \quad (6)$$

$$v^*_{q,GSC} = Ri_{gq} + L\frac{di_{gq}}{dt} + \omega Li_{gd} + v_{gq}$$

By aligning the d-axis of the reference frame of GSC control with the grid voltage, active and reactive power supplied or absorbed by the GSC can be written as:

$$P = \frac{3}{2}v_{gd}i_{gd} \quad (7)$$

$$Q = \frac{3}{2}v_{gd}i_{gq}$$

The active power, and thus the DC link voltage, is proportional to $i_{gd}$ and may be regulated by controlling $v^*_{d,GSC}$, while the reactive power is proportional to $i_{gq}$ and may be regulated by controlling $v^*_{q,GSC}$. In normal mode operation, the reference d-axis GSC current ($i^*_{gd}$) may be generated using PI controller over average DC link voltage and the reference q-axis GSC current ($i^*_{gq}$) may be set equal to zero. The reference voltage ($v^*_{GSC}$) that is generated by GSC control to regulate GSC current to its reference value may be computed by employing decoupled current control in accordance with equation (6) above.

In normal steady state operation, the voltage to be injected by the NSC at neutral side of the stator winding is zero. Thus, in normal mode operation the NSC controller is inactive and the reference voltage to be generated by NSC ($v^*_{GSC}$) is kept equal to zero.

Both the GSC and NSC operation may be carried out by nine-switch converter circuitry 310 in a fault tolerant DFIG configuration consistent with the present disclosure. Similar to most reduced component converter topologies, nine-switch converter circuitry 310 faces limitations imposed on its allowable switching states. Both output terminals of same phase in nine-switch converter circuitry 310 can only connect to either $+v_{dc}$ or 0 V, or the upper output terminal to $+v_{dc}$ and the lower output terminal to 0 V. The combination where the upper output terminal needs to be connected to 0 V and the lower output terminal to $+v_{dc}$ is not allowed. To resolve this limitation, two modulating references of the same phase should share the modulation space without intersecting each other. This may be achieved by always placing the reference for upper terminal above that of the lower terminal by adding offsets to both the references. The adjustment of the three-phase modulating reference signals in the modulation space by adding the same offset to all the three phases does not show any impact on the output (e.g., line voltages) of the converter (e.g., using a third-harmonic injection PWM method). A modulating reference signal adjustment method for nine-switch converter circuitry 310 may be based on, for example, 120°-discontinuous modulation. The offsetted reference voltage signals for GSC and NSC may be written as:

$$v^*_{GSC,abc}{}' = v^*_{GSC,abc} + [1 - \max(v^*_{GSC,abc})]$$

$$v^*_{NSC,abc}{}' = v^*_{NSC,abc} - [1 + \min(v^*_{NSC,abc})] \quad (8)$$

Offsetted reference signals $v_{GSC}{}^{*'}$ and $v_{NSC}{}^{*'}$ may be fed to the individual three-phase pulse width modulation (PWM) generators (e.g., PWM-I and PWM-II) that generate two different sets of six PWM signals. In example nine-switch converter circuitry 310 the middle three switches (e.g., G2, G5 and G8) may be shared, so their gate pulses may be generated by logical OR operation of the PWM signals corresponding to the lower three switches generated by PWM-I and upper three switches generated by PWM-II. The PWM signals corresponding to upper three switches by PWM-I (e.g., G1, G4 and G7) and lower three switches by PWM-II (e.g., G3, G6 and G9) may be issued directly to the upper three and the lower three switches, respectively, of nine-switch converter circuitry 310.

It is important to note that during normal mode operation the reference voltages ($v_{NSC,abc}^{*}$) for the NSC are zero and hence offsetted reference signals ($v_{NSC,abc}^{*'}$) are minus one. This means that the PWM signals for the lower three switches of nine-switch converter circuitry 310 are always at logic high and corresponding switches are ON, which effectively short circuit the stator windings on neutral side and form the Y-point.

During fault mode of operation, NSC circuitry 314 is controlled to maintain pre-fault voltage across the stator winding, while control for RSC circuitry 306 and GSC circuitry 312 is switched to supply reactive current in line with the requirement of the recent grid codes (e.g., FIG. 2). To achieve transient free operation, it may be necessary to detect the grid fault with least possible delay. The fault in the system can be detected almost instantaneously by measuring the absolute error between reference grid voltage magnitude (1 pu) and actual grid voltage magnitude (in pu) as follows:

$$V_{error} = |1 - \sqrt{v_{gd}^2 + v_{gq}^2}| \quad (9)$$

A grid fault is detected whenever $V_{error}$ exceeds the threshold (typically 0.1 pu). Once the grid fault is detected, the fault signal in FIGS. 4 and 5 may change from a low to high logic value. As $V_{error}$ will oscillate above and below the threshold during the unsymmetrical faults, the fault removal is detected when the one cycle average of $V_{error}$ falls below the threshold. Example actions that may be taken by the controller of different converters during the grid fault condition are discussed below.

The rotor side converter has the capability to provide full reactive support required by the recent grid codes during a grid fault condition provided that the neutral-side converter operations keeps the pre-fault voltage across the stator winding. However, if the RSC control is switched to supply full reactive current, the active current supplied by the stator has to be reduced to keep RSC switch currents below safe limit. This may lead to the over speeding of the rotor and hence increased mechanical stress due to the storage of the energy produced by the WT as kinetic energy. To reduce the negative impact of increased mechanical stress on WT's construction, it is advisable to maximize active power extraction along with reactive current supply. To achieve this, the reactive currents required to fulfill the grid code requirements may be shared by GSC circuitry 312 and RSC circuitry 306 during grid faults in proportion to their ratings. For example, the duty of supplying two third of the reactive current (maximum 0.6 pu) is assigned to stator and hence RSC circuitry 306, while, one third (maximum 0.3 pu) may be assigned to GSC circuitry 310. To supply the reactive current assigned to stator during a fault condition, the $i^{*}_{rd}$ may be computed using PI controller over reference stator reactive current $i^{*}_{sd}$ (d-axis current is proportional to reactive power as the reference d-axis is oriented to stator flux) as shown in FIG. 4. The $i^{*}_{sd}$ may be calculated using equation (10) to support two thirds of the reactive current required by the reactive current requirement of the example grid code disclosed in FIG. 2.

$$i^{*}_{sd} = \begin{cases} -\dfrac{0.6}{0.4}(0.9 - V_g), & \text{if } 0.5 \le V_g \le 0.9 \\ -0.6, & \text{if } V_g < 0.5 \end{cases} \quad (10)$$

In equation (10), $V_g$ is a positive sequence grid voltage magnitude and may be calculated within the 20 ms to fulfill the example grid code requirement. In fault mode operation, priority is given to the $i^{*}_{rd}$ to strictly support reactive current and the limit on $i^{*}_{rq}$ is calculated as, $$i^{*}_{rq,limit} = \pm\sqrt{i_{r,max}^2 - i^{*2}_{rd}} \quad (11)$$

As discussed above, DBR 316 may be employed during a fault condition to keep the DC link voltage below safe limit, which may interfere with GSC control. Therefore during grid fault condition to assist RSC circuitry 306, the GSC controller may be switched to supply a portion of (e.g., one third) of the reactive current required to fulfill the example grid code requirement. The reference reactive current ($i^{*}_{gq}$) for GSC control during fault mode of operation may be computed as per equation (12) and the GSC current may be limited to $i_{g,max}$ by putting limits on active current ($i^{*}_{gd}$) as per equation (13):

$$i^{*}_{gq} = \begin{cases} \dfrac{0.3}{0.4}(0.9 - V_g), & \text{if } 0.5 \le V_g \le 0.9 \\ 0.3, & \text{if } V_g < 0.5 \end{cases} \quad (12)$$

$$i^{*}_{gd,limit} = \pm\sqrt{i_{g,max}^2 - i^{*2}_{gq}} \quad (13)$$

At least one objective of NSC control during a fault condition is to maintain the pre-fault voltage across the stator winding to ensure proper functioning of the RSC control. The logic high on the fault signal during a fault condition activates the NSC controller as shown in FIG. 5. The compensating voltage ($v_{dq,C}$) to be injected by the NSC on the neutral side of the stator winding during fault condition may then be computed as:

$$v_{dq,C} = v_{dq} - v_{dq_{pf}} \quad (14)$$

In equation (14) $v_{dq}$ and $v_{dq_{pf}}$ are the present grid voltages and the pre-fault grid voltages, respectively, computed using pre-fault grid voltage vector angle $\omega t_{pf}$. The pre-fault grid voltage vector angle $\omega t_{pf}$ may be obtained by saturating the phase-locked loop (PLL) over the grid voltage using the fault signal as shown in FIG. 5. The pre-fault grid voltage $v_{dq_{pf}}$ may then be computed by holding the samples of two cycle mean value of $v_{dq}$ when fault is detected.

The compensating voltages $v_{dq,C}$ can be used directly as the reference voltages to control the NSC in open-loop operation by converting them to a stationary reference frame. The open-loop control may work satisfactorily for the NSC due to the absence of output filter and series injection transformer. However, there will be series voltage drop across the switches of the NSC which may affect the compensation. To achieve perfect compensation of the voltage dip, the switching voltage drop may be added to $v_{dq,C}$ by estimating it using a PI controller that maintains the stator flux ($\psi_{s,dq}$) at its pre-fault value ($\psi_{s,dq_{pf}}$) as shown in FIG. 5. The d–q axis stator flux components in FIG. 5 may be estimated using equations (1) and (2) while, the pre-fault stator flux components may be obtained by holding the samples of two cycle mean value of $\psi_{s,dq}$ when fault is detected.

Figure 6:
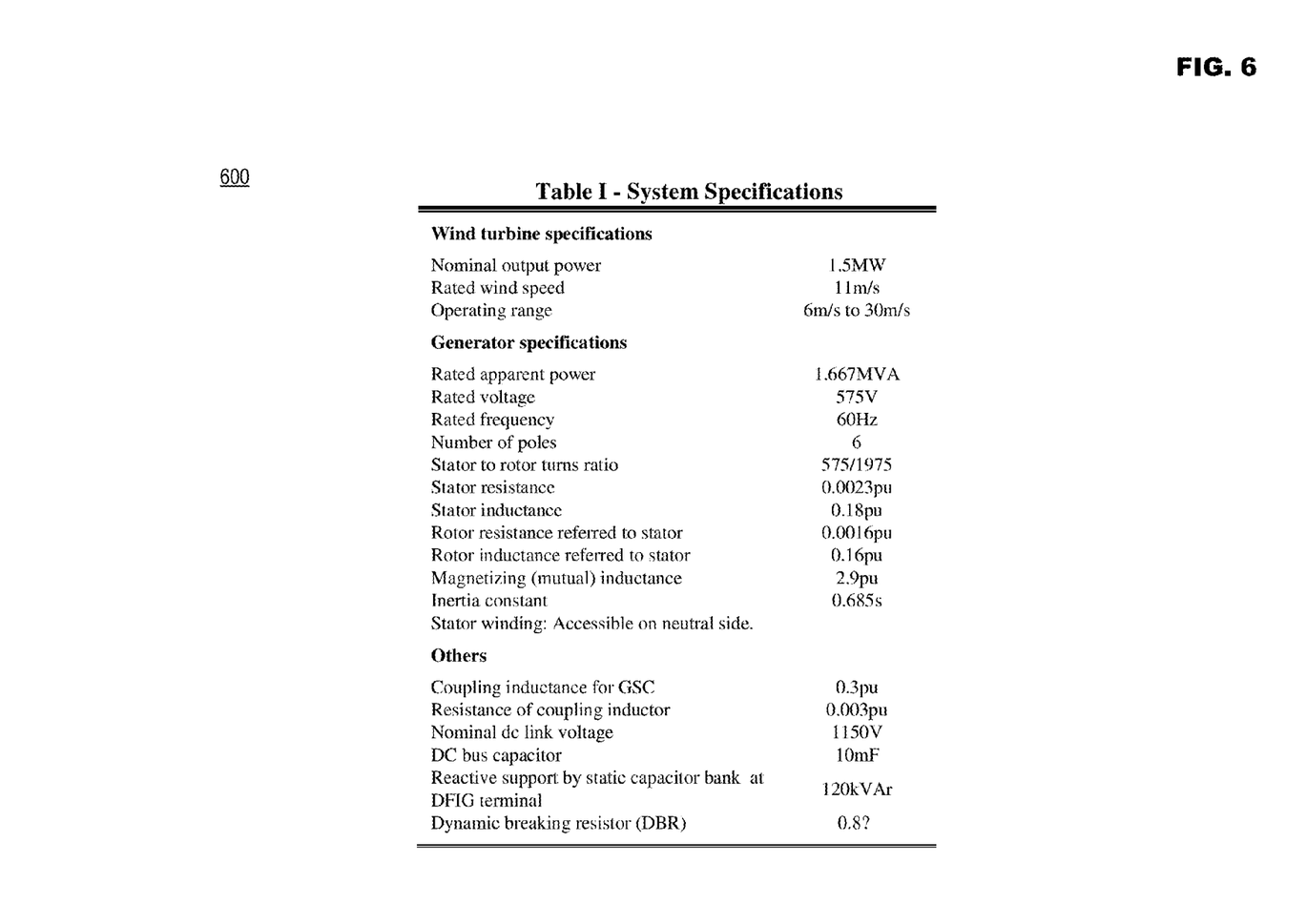
FIG. 6 illustrates example system specifications in accordance with at least one embodiment of the present disclosure.

To verify the effectiveness of embodiments consistent with the present disclosure, an extensive simulation study was carried out in MATLAB. A detailed model of a DFIG with six-terminal stator and the power electronics converters were developed using SIMULINK and SimPowerSystems toolboxes. To represent the actual operating conditions, it was assumed that the DFIG wind turbine is connected to a medium voltage network (120 kV) through a step-up transformer (e.g., 575V-Yg/25 kV-Δ), a transmission line (e.g., 25 kV-50 km), and another step-up transformer (e.g., 25 kV-Δ/120 kV-Yg) as shown in FIG. 3. The wind turbine specifications and machine parameters used the example simulation are disclosed in Table 600 in FIG. 6.

Figure 7:
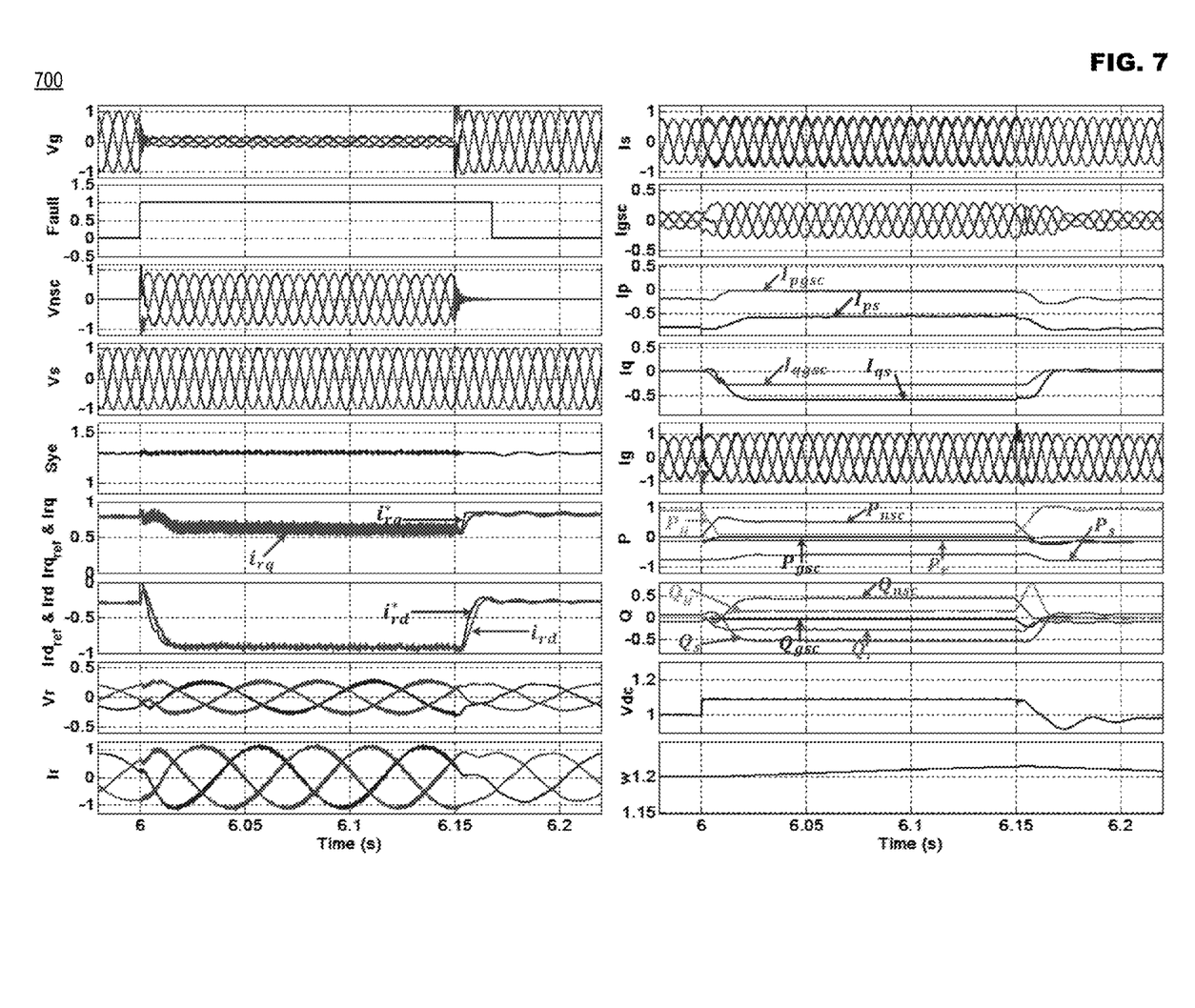
FIG. 7 illustrates example system performance during a line-to-line-to-line-to-ground (LLLG) fault in accordance with at least one embodiment of the present disclosure.
Figure 8:
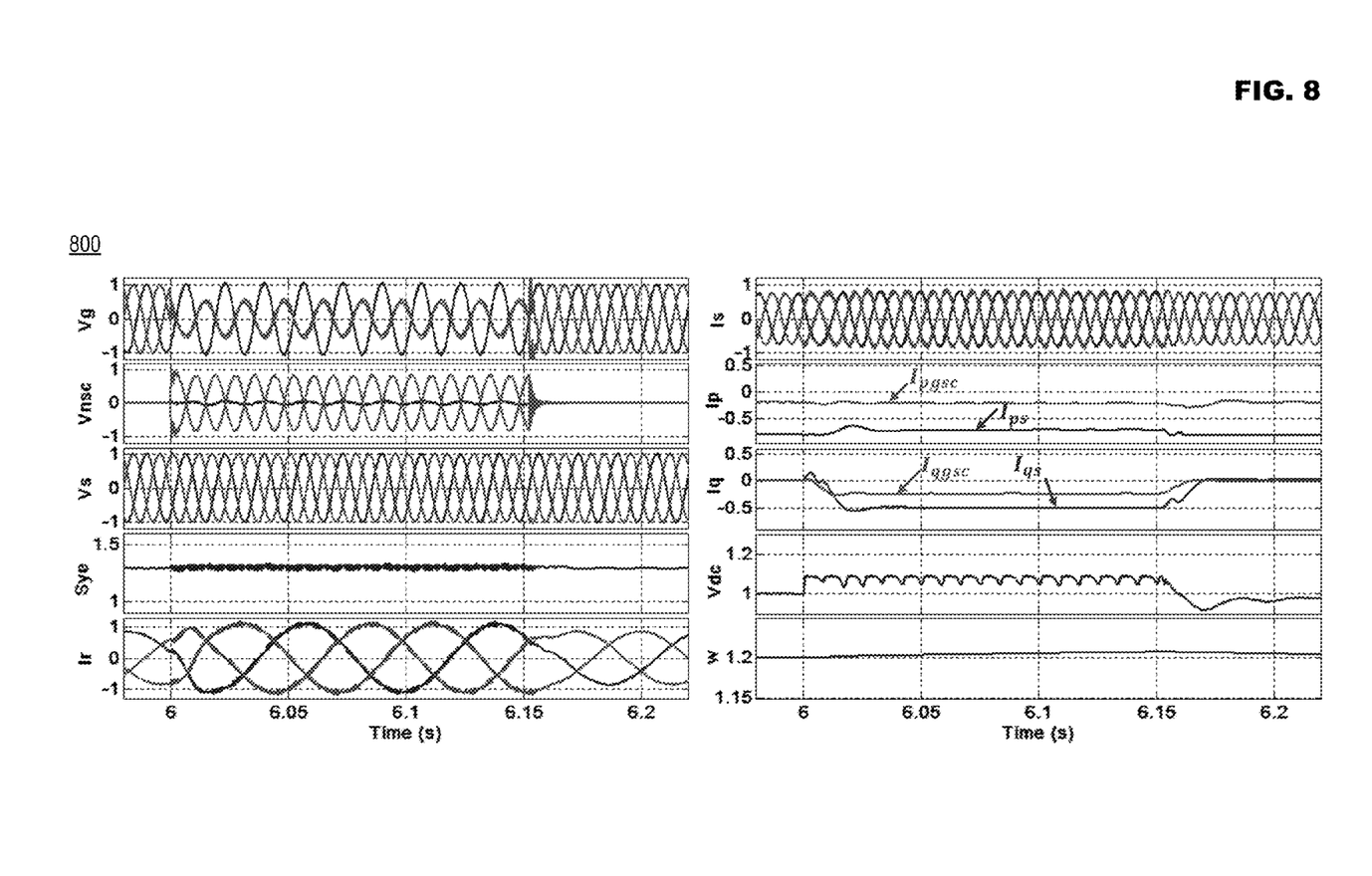
FIG. 8 illustrates example system performance during a line-to-line (LL) fault in accordance with at least one embodiment of the present disclosure.
Figure 9:
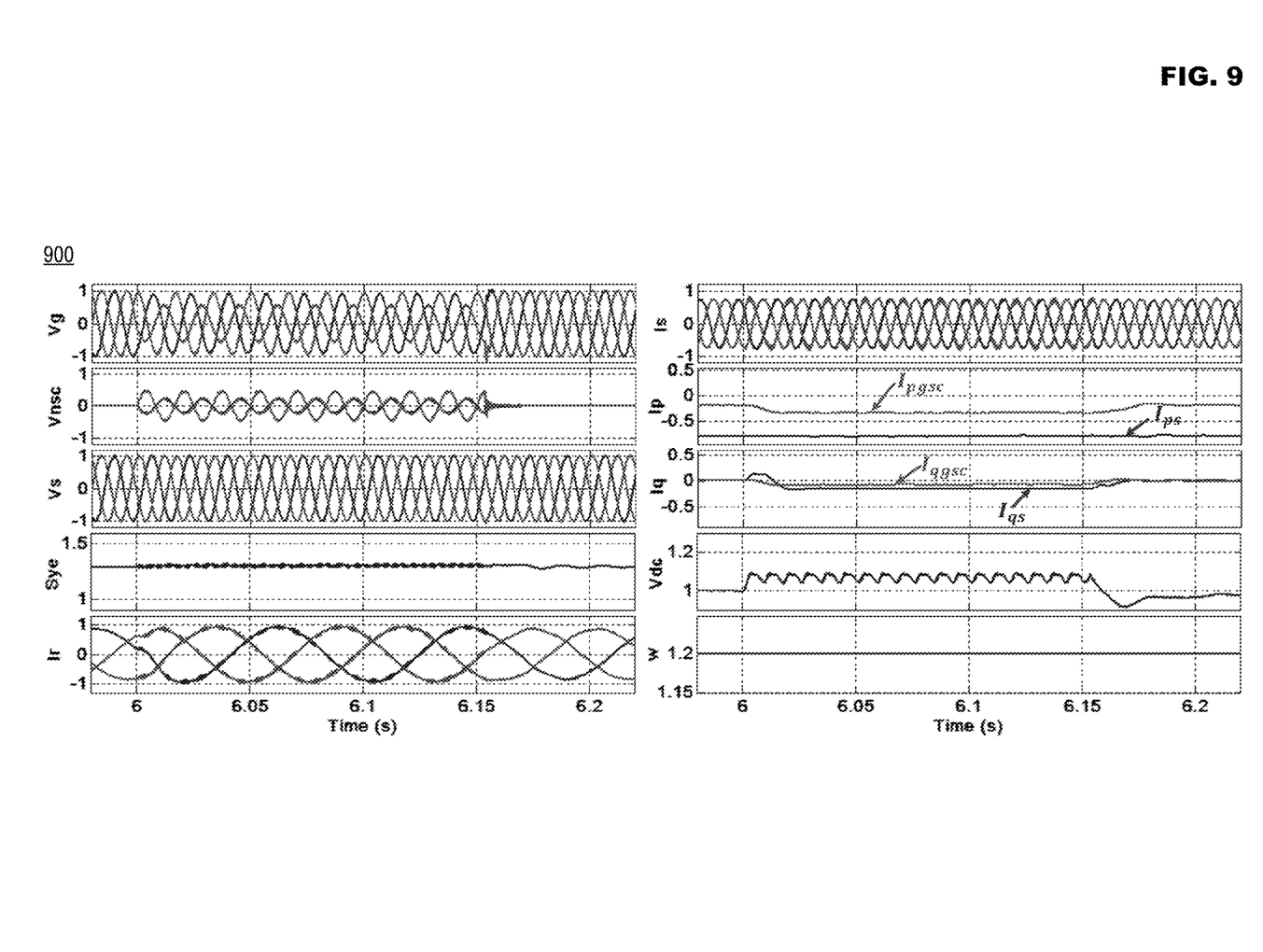
FIG. 9 illustrates example system performance during a line-to-ground (LG) fault in accordance with at least one embodiment of the present disclosure.

Performance of the above simulation was evaluated under line-to-line-to-line-to-ground (LLLG), line-to-line (LL) and line-to-ground (LG) faults at 120 kV bus and the corresponding results are shown in FIGS. 7 to 9. To establish compatibility with recent and/or proposed grid codes for the effective FRT operation, faults were emulated for the duration of 150 ms (e.g., nine cycles of supply). All the results are represented in per unit for a wind speed of 15 m/s.

A detailed example of LLLG fault response is illustrated in chart 700 in FIG. 7. In the example of chart 700, the system is under steady state before the simulation time of 6 s. A LLLG fault lasting for 150 ms is then applied on 120 kV bus at 6 s, which may be observed from the dip in the grid voltages ($v_g$) from 1 pu to 01 pu. The moment a fault is detected, fault mode operation is enabled by a logic high of the Fault signal. This enables the NSC which injects compensating voltage (e.g., PWM switching voltage switched between $\pm v_{dc}$) on the neutral side of the stator winding to maintain pre-fault voltage across it. For better visualization of NSC functionality in maintaining pre-fault voltage across the stator winding, in FIG. 7 an average (e.g., over a switching period) compensating voltage ($v_{nsc}$) is shown instead of the actual PWM switching voltage. It is important to note that the average voltage across the stator winding ($v_s$) does not experience any change due to the instantaneous voltage compensation by the NSC (e.g., without any delay as no transfer switches are involved). The effectiveness of the NSC in keeping pre-fault voltage across the stator winding may also be evident from the trace of the stator flux vector Sye ($\psi_s$) as it is maintained constant throughout the fault duration.

As discussed above, during the grid fault condition, the RSC control is switched to supply reactive current by giving priority to $i^*_{rd}$. With priority to $i^*_{rd}$, reference current $i^*_{rq}$ (e.g., which is responsible for maintaining WT speed, and hence, active power extraction) is limited by the relationship (11) with $i_{r,max}$ set equal to 1.1 pu. The evolution of variables $i^*_{rd}$ and $i^*_{rq}$ during fault mode operation is shown in FIG. 7. To track these reference currents, the RSC injects an average rotor voltage $v_r$ across the rotor terminal that forces rotor current $I_r$ to flow in rotor winding and corresponding stator current, $I_s$ in stator winding. It is important to note that the sinusoidal stator current ($I_s$) may be achieved with permissible switching ripples even though the voltage injected by NSC on the neutral side of the stator winding is the PWM switching voltage. The sufficiently high stator self-inductance served the purpose of filter inductance. This shows that there is no need of an output filter with NSC similar to RSC.

The GSC may also be switched to reactive current control mode during fault condition (e.g., FIG. 5). The resulted GSC current due to this control switch over is depicted in FIG. 7 as $I_{gsc}$. The injection of the reactive current assigned to GSC as per equation (12) can be observed from the phase jump and increase in magnitude of GSC current.

To illustrate the effectiveness of reactive current control mode precisely, the active ($I_p$) and reactive ($I_q$) components of the stator and GSC currents during LLLG fault are presented in chart 700. As the positive sequence grid voltage falls to well below 0.5 pu (e.g., 0.1 pu) during the fault condition, the DFIG injects a total of 0.9 pu reactive current ($I_q$) as per FIG. 1(b). This total reactive current is shared by stator and GSC in 2:1 ratio. Moreover, due to the increase in stator and GSC reactive currents, corresponding active currents ($I_p$) are reduced for the safe operation of the converters.

To better comprehend the functionality of different converters, the active and reactive powers absorbed by the different components of the DFIG system are also plotted in chart 700. Positive signs indicate power absorption while negative signs indicate power generation. From the active power plot, it can be noticed that during steady state (e.g., before 6 s) the active power absorbed by the grid ($P_g$) is equal to active power generated by the stator ($P_s$) plus GSC ($P_{gsc}$). The active power produced by the rotor ($P_r$) is exactly equal to $P_{gsc}$ as the objective of the GSC is to transfer $P_r$ into the grid via DC link during normal mode of operation. The power absorbed by the NSC may be observed to be zero during steady state as the NSC is not active in normal mode of operation. Whereas during the grid fault, as discussed above, with the reduction in the active component of stator and rotor currents to accommodate the necessary reactive current, a little dip in the $P_s$ and $P_r$ may be observed although the stator voltage ($v_s$) is maintained at its pre-fault value by the NSC. The active power injected into the grid by the GSC ($P_{gsc}$) is zero as the GSC is injecting reactive current up to its limit during the grid fault. With the reduction in grid voltage during grid fault, there is a proportionate reduction in the active power delivered to the grid ($P_g$). Thus, there is a net amount of excess stator active power equal to the difference between absolute values of $P_s$ and $P_g$. This excess power is absorbed by the NSC ($P_{nsc}$) and dissipated in the DBR at DC link. The active power produced by the rotor ($P_r$) is also dissipated in the DBR as the power absorbed by the GSC ($P_{gsc}$) from the DC link is zero. Similar analysis may also result for the reactive power of different components from the plot of reactive powers.

Because of the reduction in active power of the stator to accommodate the required reactive current component during grid fault, a little rise in rotor speed (w) may be observed due to the accumulation of kinetic energy. Moreover, as there may be a net amount of excess power pumped into the DC link by NSC and RSC during fault condition, the DBR may come into the picture to prevent the DC link from over voltages (e.g., not more than 1250V). As soon as the fault is removed from the system, the active current ($I_p$) of the stator again increases (e.g., within 20 ms) to feed the full active power produced by the WT, which effectively fulfills the recent grid code requirements.

The performance of proposed fault tolerant DFIG configuration has also been evaluated for unsymmetrical faults. The responses of the DFIG during an LL fault (e.g., chart 800) and an LG fault (e.g., chart 900) are shown in FIGS. 8 and 9, respectively. It may be seen that the DFIG is able to seamlessly ride through both these faults without noticeable transients. It may also be observed that the currents injected by the DFIG into the grid are balanced although the faults are unsymmetrical in nature. Moreover, the DFIG effectively injects reactive current corresponding to the positive sequence grid voltage (e.g., in accordance with the requirements shown in FIG. 2).

DFIG systems consistent with the present disclosure may effectively keep the pre-fault voltage across the stator winding of DFIG during any type of fault condition to achieve transient free FRT. The resulting cost-effective solution achieves series voltage compensation using only three full rated extra switches in the proposed solution compared to DVR solution where a full rated six-switch converter is required. Using reactive current sharing control, a DFIG is able to fulfill all the requirements of the recent and/or proposed grid codes. As the compensation of grid voltage variations is achieved from the neutral side of the stator winding, there is no need of full rated series injection transformer as in case of the DVR solution. Further, there is also no need of output filter for the injected voltages as the stator self-inductance will be sufficiently high. DFIG systems consistent with the present disclosure do not involve any transfer switch operation (e.g., required to short circuit series injection transformer during steady state operation in case of DVR solution) during FRT, and thus, may seamlessly ride through any kind of grid fault.

Figure 10:
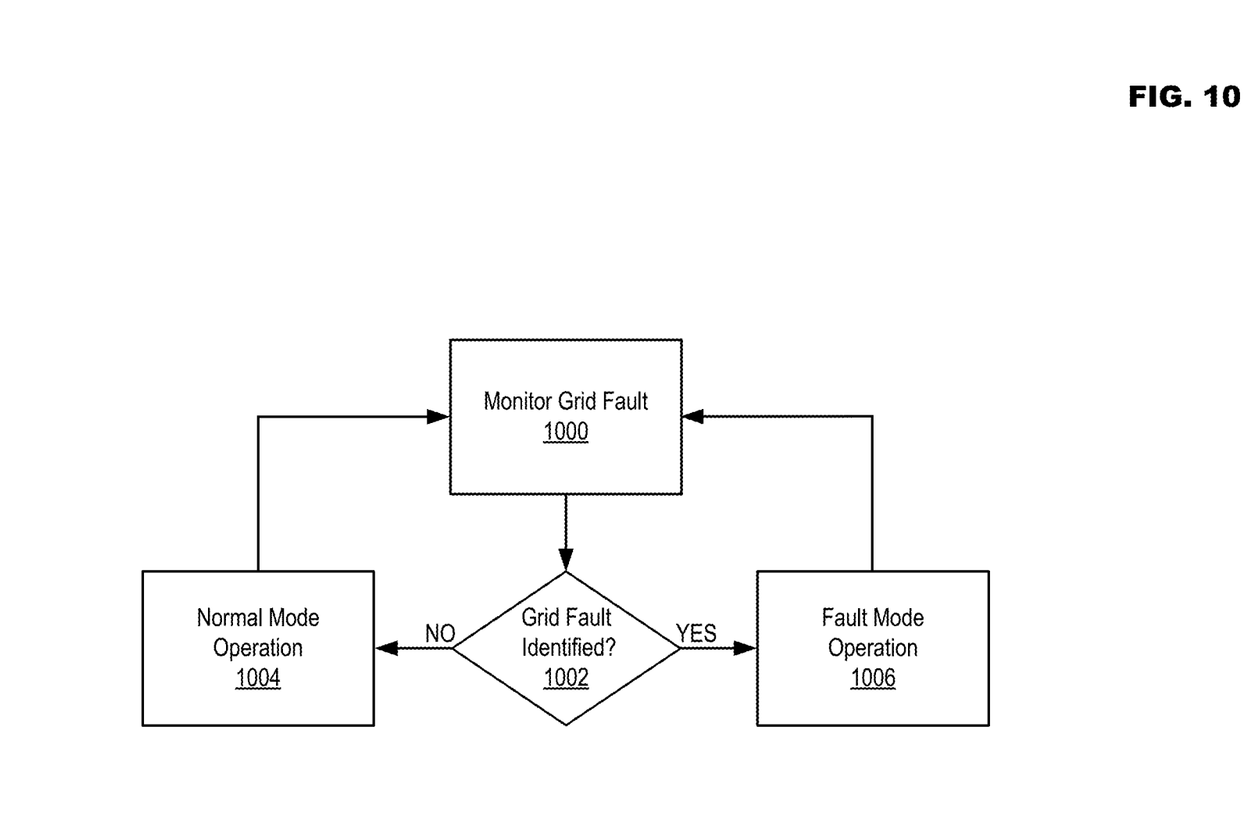
FIG. 10 illustrates example operations for a fault-tolerant wind energy conversion system in accordance with at least one embodiment of the present disclosure.

FIG. 10 illustrates example operations for a fault-tolerant energy conversion system in accordance with at least one embodiment of the present disclosure. In operation 1000 an electrical grid may be monitored for faults. For example, the monitoring may be performed by a DFIG system coupled to the electrical grid. A determination may then be made in operation 1002 as to whether a fault in the electrical grid has been identified. If in operation 1002 it is determined that no fault has been identified, then in operation 1004 normal mode operation may continue (e.g., GSC circuitry in nine-switch controller circuitry may be used to regulate a DC link voltage across a DC link capacitor in the DFIG). Operation 1004 may then be followed by a return to operation 1000 to continue monitoring for faults. If in operation 1002 a determination is made that a fault has been identified, then operation 1006 the DFIG may switch to fault mode operation wherein the RSC and GSC circuitry may be controlled to maintain reactive current (e.g., in accordance with requirements set forth by a power grid code). Moreover, control for NSC circuitry in the nine-switch converter circuitry may be switched to a fault mode to maintain a pre-fault voltage across windings in a stator in the DFIG system. Operation 1006 may then be followed by a return to operation 1000 to monitor for the fault to be cleared.

While FIG. 10 illustrates various operations according to an embodiment, it is to be understood that not all of the operations depicted in FIG. 10 are necessary for other embodiments. Indeed, it is fully contemplated herein that in other embodiments of the present disclosure, the operations depicted in FIG. 10, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smart phones, etc.

Any of the operations described herein may be implemented in a system that includes one or more machine-readable storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

The following examples pertain to various embodiments. In one example there is provided a system. The example system may include a doubly fed induction generator (DFIG) comprising a rotor and a stator coupled to an electrical grid, the DFIG being configured to generate power for the electrical grid, rotor-side converter (RSC) circuitry coupled to at least the rotor, the RSC circuitry being to control the power generation on the rotor side of the DFIG and nine-switch converter circuitry coupled to at least the stator and the electrical grid, the nine-switch converter circuitry being to at least maintain a pre-fault voltage across windings in the stator during a grid fault.

The above example system may be further configured, wherein the nine-switch converter circuitry provides a first independent three-phase output and a second independent three-phase output. In this configuration the example system may be further configured, wherein the first independent three-phase output comprises six of the nine switches in the nine-switch converter circuitry, the six switches corresponding to grid-side converter (GSC) circuitry in the DFIG. In this configuration the example system may be further configured, wherein the GSC circuitry is coupled to the grid through an interfacing inductor comprising inductors coupled to each of the phases in the first independent three-phase output. In this configuration the example system may be further configured, wherein the second independent three-phase output comprises six of the nine switches in the nine-switch converter circuitry, the six switches corresponding to neutral-side control (NSC) circuitry coupled to a neutral side of windings in the stator to provide series voltage compensation to the DFIG when a fault occurs in the grid. In this configuration the example system may further comprise a DC link capacitor coupled in parallel between the RSC circuitry and nine-switch converter. In this configuration the example system may further comprise at least one controller to control operation of the RSC circuitry and the nine-switch controller circuitry. In this configuration the example system may be further configured, wherein during normal operation the at least one controller is to cause the GSC circuitry to regulate a DC link voltage across the DC link capacitor. In this configuration the example system may be further configured, wherein during a fault the at least one controller is to cause the NSC circuitry to generate compensating voltages on the neutral side of the of the stator winding. In this configuration the example system may further comprise a dynamic braking resistor coupled across the DC link capacitor.

In another example there is provided a method. The example method may include monitoring for a fault in an electrical grid coupled to a doubly fed induction generator (DFIG) comprising a rotor and a stator, and after monitoring a fault in the electrical grid, controlling rotor-side converter (RSC) circuitry coupled to at least the rotor to maintain reactive power in the DFIG and controlling nine-switch converter circuitry coupled to the stator and the electrical grid to maintain a pre-fault voltage across windings in the stator.

The above example method may be further configured, wherein monitoring for a fault comprises measuring absolute error between a reference grid voltage magnitude and an actual grid voltage magnitude and determining if the absolute error has exceeded a predetermined threshold error.

The above example method may be further configured, alone or in combination with the above further configurations, wherein controlling the RSC circuitry comprises allocating responsibility to the RSC circuitry for supplying a first portion of an active current requirement and responsibility to grid-side converter (GSC) circuitry in the nine-switch converter circuitry for supplying a second portion of the active current requirement. In this configuration the example method may be further configured, wherein the nine-switch converter circuitry comprises a first independent three-phase output corresponding to the GSC circuitry coupled to the grid through an interfacing inductor to control normal operation in the DFIG and a second independent three-phase output corresponding to neutral-side converter (NSC) circuitry coupled to a neutral side of windings in the stator to provide series voltage compensation to the DFIG when a fault occurs in the grid, and controlling the nine-switch converter circuitry comprises causing the NSC circuitry to generate compensating voltages on the neutral side of the of the stator winding.

The above example method may further comprise, alone or in combination with the above further configurations, engaging a dynamic breaking resistor (DBR) coupled across a DC link capacitor coupled in parallel between the RSC circuitry and GSC circuitry to protect the DC link capacitor from overvoltage during a fault.

In another example there is provided at least one machine-readable storage medium. The at least one machine-readable storage medium may have stored thereon, individually or in combination, instructions that when executed by one or more processors result in the following operations comprising monitoring for a fault in an electrical grid coupled to a doubly fed induction generator (DFIG) comprising a rotor and a stator, and after monitoring a fault in the electrical grid, controlling rotor-side converter (RSC) circuitry coupled to at least the rotor to maintain reactive power in the DFIG and controlling nine-switch converter circuitry coupled to the stator and the electrical grid to maintain a pre-fault voltage across windings in the stator.

The above example medium may be further configured, wherein monitoring for a fault comprises measuring absolute error between a reference grid voltage magnitude and an actual grid voltage magnitude and determining if the absolute error has exceeded a predetermined threshold error.

The above example medium may be further configured, alone or in combination with the above further configurations, wherein controlling the RSC circuitry comprises allocating responsibility to the RSC circuitry for supplying a first portion of an active current requirement and responsibility to grid-side converter (GSC) circuitry in the nine-switch converter circuitry for supplying a second portion of the active current requirement. In this configuration the example medium may be further configured, wherein the nine-switch converter circuitry comprises a first independent three-phase output corresponding to the GSC circuitry coupled to the grid through an interfacing inductor to control normal operation in the DFIG and a second independent three-phase output corresponding to neutral-side converter (NSC) circuitry coupled to a neutral side of windings in the stator to provide series voltage compensation to the DFIG when a fault occurs in the grid, and controlling the nine-switch converter circuitry comprises causing the NSC circuitry to generate compensating voltages on the neutral side of the of the stator winding.

The above example medium may further comprise, alone or in combination with the above further configurations, instructions that when executed by one or more processors result in the following operations comprising engaging a dynamic breaking resistor (DBR) coupled across a DC link capacitor coupled in parallel between the RSC circuitry and GSC circuitry to protect the DC link capacitor from overvoltage during a fault.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:
1. A system, comprising:
a doubly fed induction generator (DFIG) comprising a rotor and a stator coupled to an electrical grid, the DFIG configured to generate power for the electrical grid;
rotor-side converter (RSC) circuitry coupled to at least the rotor, the RSC circuitry to control the power generation on the rotor side of the DFIG; and
nine-switch converter circuitry coupled to at least the stator and the electrical grid, the nine-switch converter circuitry to at least maintain a pre-fault voltage across windings in the stator during a grid fault;
wherein the nine-switch converter circuitry provides a first independent three-phase output and a second independent three-phase output, the first independent three-phase output comprising six of the nine switches in the nine-switch converter circuitry, the six switches corresponding to grid-side converter (GSC) circuitry in the DFIG, and the second independent three-phase output comprising six of the nine switches in the nine-switch converter circuitry, the six switches corresponding to neutral-side control (NSC) circuitry coupled to a neutral side of windings in the stator to provide series voltage compensation to the DFIG when a fault occurs in the grid.

2. The system of claim 1, wherein the GSC circuitry is coupled to the grid through an interfacing inductor comprising inductors coupled to each of the phases in the first independent three-phase output.

3. The system of claim 1, further comprising a DC link capacitor coupled in parallel between the RSC circuitry and nine-switch converter.

4. The system of claim 3, further comprising at least one controller to control operation of the RSC circuitry and the nine-switch controller circuitry.

5. The system of claim 4, wherein during normal operation the at least one controller is to cause the GSC circuitry to regulate a DC link voltage across the DC link capacitor.

6. The system of claim 4, wherein during a fault the at least one controller is to cause the NSC circuitry to generate compensating voltages on the neutral side of the of the stator winding.

7. The system of claim 1, further comprising a dynamic braking resistor coupled across the DC link capacitor.

8. A method, comprising:
monitoring for a fault in an electrical grid coupled to a doubly fed induction generator (DFIG) comprising a rotor and a stator; and
after monitoring a fault in the electrical grid:
controlling rotor-side converter (RSC) circuitry coupled to at least the rotor to maintain reactive power in the DFIG; and
controlling nine-switch converter circuitry coupled to the stator and the electrical grid to maintain a pre-fault voltage across windings in the stator;
wherein controlling the RSC circuitry further comprises allocating responsibility to the RSC circuitry for supplying a first portion of an active current requirement and responsibility to grid-side converter (GSC) circuitry in the nine-switch converter circuitry for supplying a second portion of the active current requirement, the nine-switch converter circuitry comprising a first independent three-phase output corresponding to the GSC circuitry coupled to the grid through an interfacing inductor to control normal operation in the DFIG and a second independent three-phase output corresponding to neutral-side converter (NSC) circuitry coupled to a neutral side of windings in the stator to provide series voltage compensation to the DFIG when a fault occurs in the grid; and
wherein controlling the nine-switch converter circuitry further comprises causing the NSC circuitry to generate compensating voltages on the neutral side of the of the stator winding.

9. The method of claim 8, wherein monitoring for a fault comprises:
measuring absolute error between a reference grid voltage magnitude and an actual grid voltage magnitude; and
determining if the absolute error has exceeded a predetermined threshold error.

10. The method of claim 8, further comprising:
engaging a dynamic braking resistor (DBR) coupled across a DC link capacitor coupled in parallel between the RSC circuitry and GSC circuitry to protect the DC link capacitor from overvoltage during a fault.

11. At least one non-transitory machine-readable storage medium having stored thereon, individually or in combination, instructions that when executed by one or more processors result in the following operations comprising:
monitoring for a fault in an electrical grid coupled to a doubly fed induction generator (DFIG) comprising a rotor and a stator; and
after monitoring a fault in the electrical grid:
controlling rotor-side converter (RSC) circuitry coupled to at least the rotor to maintain reactive power in the DFIG; and
controlling nine-switch converter circuitry coupled to the stator and the electrical grid to maintain a pre-fault voltage across windings in the stator;
wherein controlling the RSC circuitry further comprises allocating responsibility to the RSC circuitry for supplying a first portion of an active current requirement and responsibility to grid-side converter (GSC) circuitry in the nine-switch converter circuitry for supplying a second portion of the active current requirement, wherein the nine-switch converter circuitry comprises a first independent three-phase output corresponding to the GSC circuitry coupled to the grid through an interfacing inductor to control normal operation in the DFIG and a second independent three-phase output corresponding to neutral-side converter (NSC) circuitry coupled to a neutral side of windings in the stator to provide series voltage compensation to the DFIG when a fault occurs in the grid; and
wherein controlling the nine-switch converter circuitry further comprises causing the NSC circuitry to generate compensating voltages on the neutral side of the of the stator winding.

12. The medium of claim 11, wherein monitoring for a fault comprises:
measuring absolute error between a reference grid voltage magnitude and an actual grid voltage magnitude; and
determining if the absolute error has exceeded a predetermined threshold error.

13. The medium of claim 11, further comprising instructions that when executed by one or more processors result in the following operations comprising:
engaging a dynamic braking resistor (DBR) coupled across a DC link capacitor coupled in parallel between the RSC circuitry and GSC circuitry to protect the DC link capacitor from overvoltage during a fault.

* * * * *